(12) United States Patent
Liu

(10) Patent No.: US 9,221,269 B2
(45) Date of Patent: Dec. 29, 2015

(54) METHOD AND APPARATUS FOR HIGH SPEED SURFACE BLACKENING AND COLORING WITH ULTRAFAST FIBER LASERS

(71) Applicant: Jian Liu, Sunnyvale, CA (US)

(72) Inventor: Jian Liu, Sunnyvale, CA (US)

( * ) Notice: Subject to any disclaimer, the term of this patent is extended or adjusted under 35 U.S.C. 154(b) by 212 days.

(21) Appl. No.: 13/973,856

(22) Filed: Aug. 22, 2013

(65) Prior Publication Data
US 2015/0054903 A1 Feb. 26, 2015

(51) Int. Cl.
- B82Y 30/00 (2011.01)
- B82Y 40/00 (2011.01)
- B23K 26/00 (2014.01)
- B41J 2/435 (2006.01)
- B41J 2/32 (2006.01)
- B41J 2/44 (2006.01)

(52) U.S. Cl.
CPC .............. B41J 2/32 (2013.01); B23K 26/0066 (2013.01); B23K 26/0084 (2013.01); B41J 2/442 (2013.01); B82Y 30/00 (2013.01); B82Y 40/00 (2013.01)

(58) Field of Classification Search
CPC combination set(s) only.
See application file for complete search history.

(56) References Cited

U.S. PATENT DOCUMENTS

| 8,753,990 | B2 * | 6/2014 | Gupta et al. | 438/795 |
| 2010/0219506 | A1 * | 9/2010 | Gupta et al. | 257/618 |

OTHER PUBLICATIONS

A. Y. Vorobyev and Chunlei Guo, "Femtosecond laser blackening of platinum," J. Applied Physics, 104, 053516, 2008.

Andrey A. Ionin, et al., "Femtosecond laser color marking of metal and semiconductor surfaces," Appl Phys A 106 (4), DOI 10.1007/s00339-012-6849-y, Mar. 15, 2012.

A. Y. Vorobyev and Chunlei Guo, "Direct creation of black silicon using femtosecond laser pulses," Applied Surface Science, 257, 7291-7294, 2011.

Md. Shamim Ahsan, et al., "Formation Mechanism of Nanostructures on the Stainless Steel Surface by Femtosecond Laser Pulses," JLMN—Journal of Laser Micro/Nanoengineering vol. 7, No. 2, 2012.

A. Y. Vorobyev and Chunlei Guo, "Metallic Light Absorbers Produced by Femtosecond Laser Pulses," Advances in Mechanical Engineering, vol. 2010, Article ID 452749.

B. K. A. Ngoi, et al., "Angular dispersion compensation for acousto-optic devices used for ultrashort-pulsed laser micromachining," Optics Express, vol. 9, No. 4, 200-206, 2001.

* cited by examiner

Primary Examiner — Huan Tran
(74) Attorney, Agent, or Firm — Taboada Law Firm, PLLC; John M. Taboada

(57) ABSTRACT

Methods and systems for high speed surface blackening and/or coloring are disclosed, including generating electromagnetic radiation from an ultrashort pulse laser (UPL); coupling the electromagnetic radiation from the UPL to a scanner comprising a scanning and focus range, wherein the scanner is configured to receive the electromagnetic radiation from the UPL and to scan and focus the electromagnetic radiation onto a sample; using a computer to adjust the pulse repetition rate and the energy of the UPL; using a five degree of freedom motorized stage to position the sample; using a dichroic filter positioned between the scanner and the sample; focusing an imager through the dichroic filter and onto the surface of the sample; using a processor to acquire and process images to monitor the surface blackening and/or coloring of the sample within the scanning and focus range of the electromagnetic radiation. Other embodiments are described and claimed.

34 Claims, 13 Drawing Sheets

US 9,221,269 B2

METHOD AND APPARATUS FOR HIGH SPEED SURFACE BLACKENING AND COLORING WITH ULTRAFAST FIBER LASERS

I. BACKGROUND

The invention relates generally to the field of blackening and coloring of the surface of metal and non-metal materials. More particularly, the invention relates to a method and apparatus for blackening and coloring the surface of metal and non-metal materials with an ultrafast fiber laser.

II. SUMMARY

In one respect, disclosed is an apparatus for high speed surface blackening and/or coloring comprising: an ultrashort pulse laser, wherein the ultrashort pulse laser generates an electromagnetic radiation, wherein the electromagnetic radiation comprises a wavelength, a pulse repetition rate, a pulse width, a pulse energy, and an average power; a scanner comprising a scanning and focus range, wherein the scanner is configured to receive the electromagnetic radiation from the ultrashort laser and to scan and focus the electromagnetic radiation onto one or more samples; a computer coupled to the ultrashort pulse laser, wherein the computer is configured to adjust the pulse repetition rate and the energy of the ultrashort pulse laser; a five degree of freedom motorized stage, wherein the five degree of freedom motorized stage is configured to position the one or more samples within the scanning and focus range of the electromagnetic radiation; a dichroic filter positioned between the scanner and the one or more samples; an imager focused through the dichroic filter and onto the surface of the one or more samples; and a processor configured to acquire and process images; wherein the imager and the processor are configured to monitor the surface blackening and/or coloring of the one or more samples within the scanning and focus range of the electromagnetic radiation; the apparatus being configured to write micro structures onto the surface of the one or more samples, wherein the micro structures comprise micro spikes, wherein the surface of the micro spikes are covered with one or more nano structures.

In another respect, disclosed is a method for welding comprising: generating electromagnetic radiation from an ultrashort pulse laser, wherein the electromagnetic radiation comprises a wavelength, a pulse repetition rate, a pulse width, a pulse energy, and an average power; coupling the electromagnetic radiation from the ultrashort pulse laser to a scanner comprising a scanning and focus range, wherein the scanner is configured to receive the electromagnetic radiation from the ultrashort laser and to scan and focus the electromagnetic radiation onto one or more samples; using a computer to adjust the pulse repetition rate and the energy of the ultrashort pulse laser; using a five degree of freedom motorized stage, wherein the five degree of freedom motorized stage is configured to position the one or more samples within the scanning and focus range of the electromagnetic radiation; using a dichroic filter positioned between the scanner and the one or more samples; focusing an imager through the dichroic filter and onto the surface of the one or more samples and using a processor to acquire and process images to monitor the surface blackening and/or coloring of the one or more samples within the scanning and focus range of the electromagnetic radiation; and writing micro structures onto the surface of the one or more samples, wherein the micro structures comprise micro spikes, wherein the surface of the micro spikes are covered with one or more nano structures.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 8A:
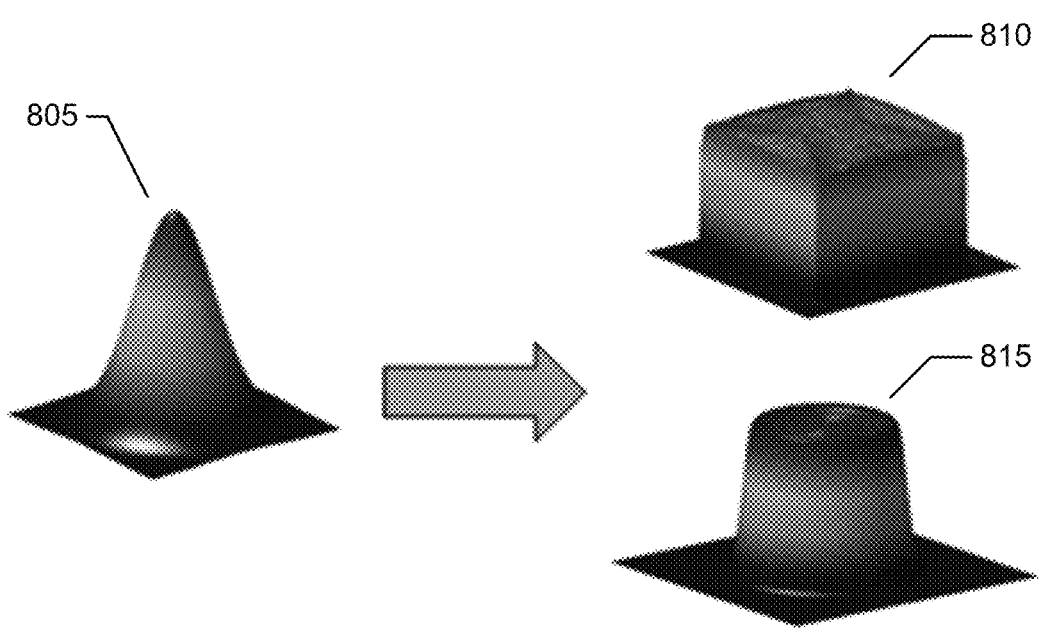
Figure 8B:
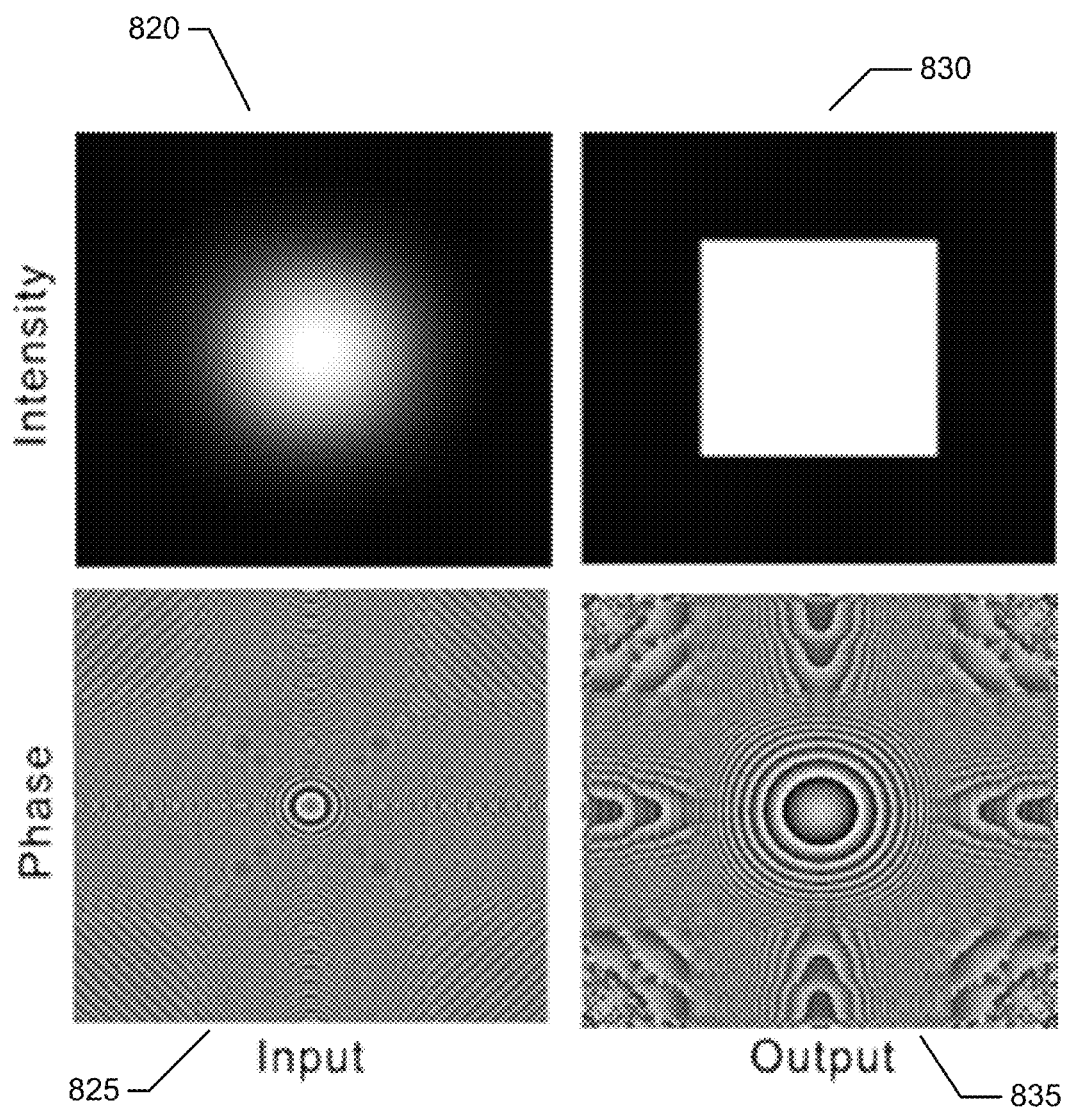
Figure 8C:
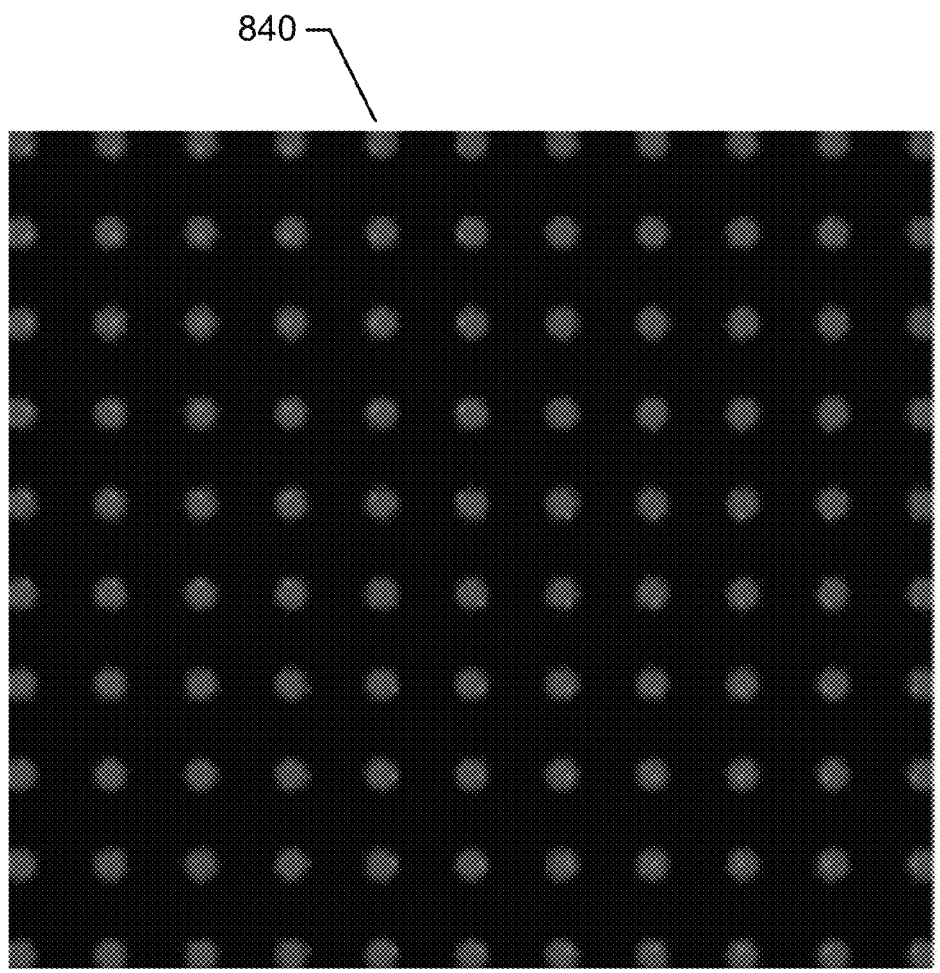

FIGS. 8A, 8B, and 8C are examples of changing a Gaussian beam into square or circular flat top shapes, the phase and intensity changes from a diffractive optical element, and multiple beamlets from a diffractive optical element, respectively, in accordance with some embodiments.

Figure 9A:
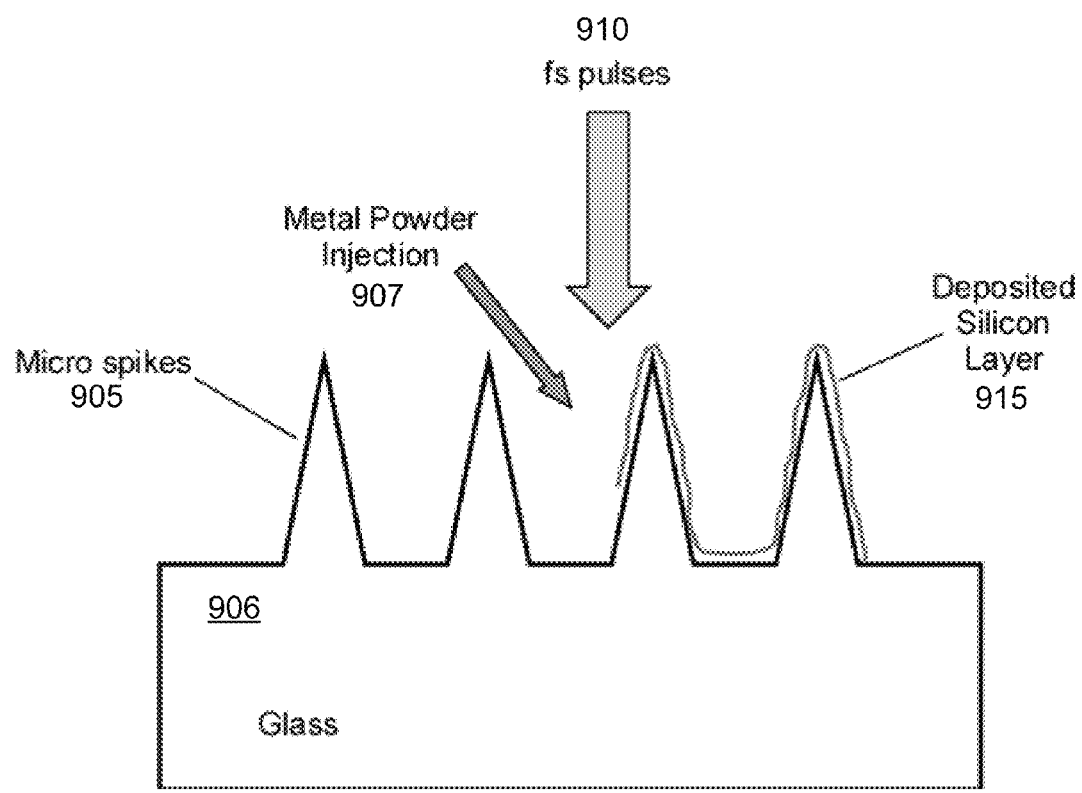
Figure 9B:
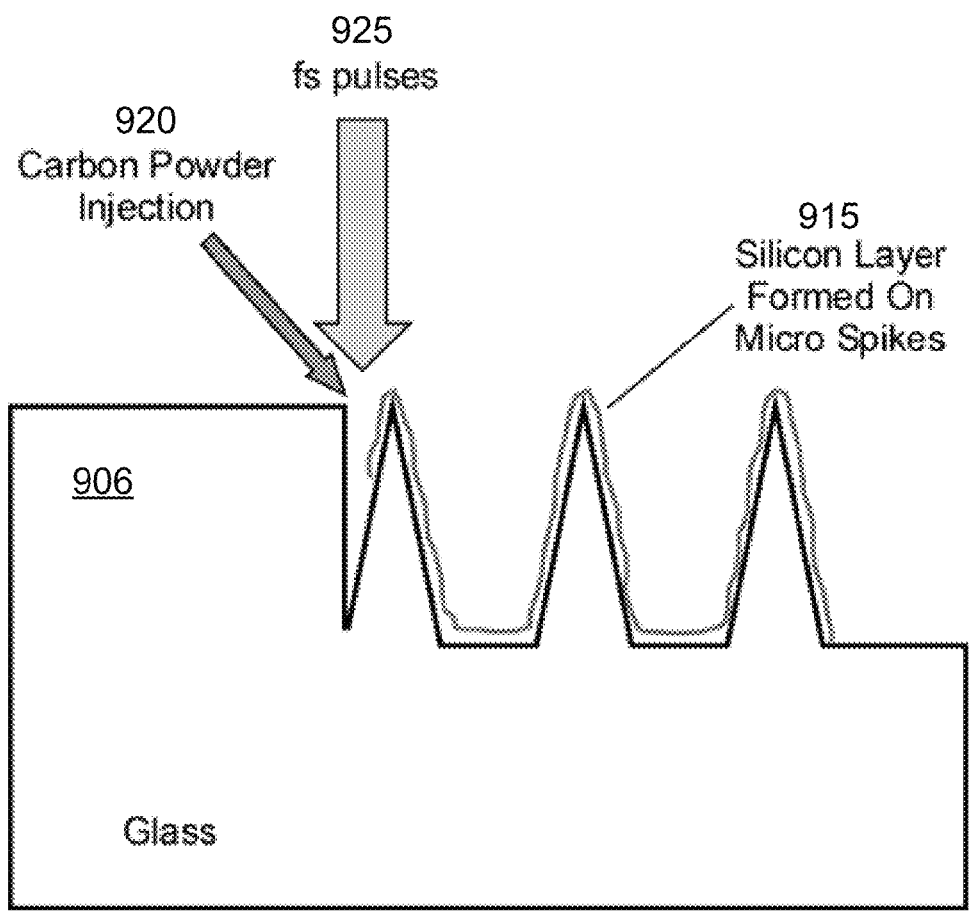

FIGS. 9A and 9B illustrate two methods for blackening a glass surface, in accordance with some embodiments.

Figure 10:
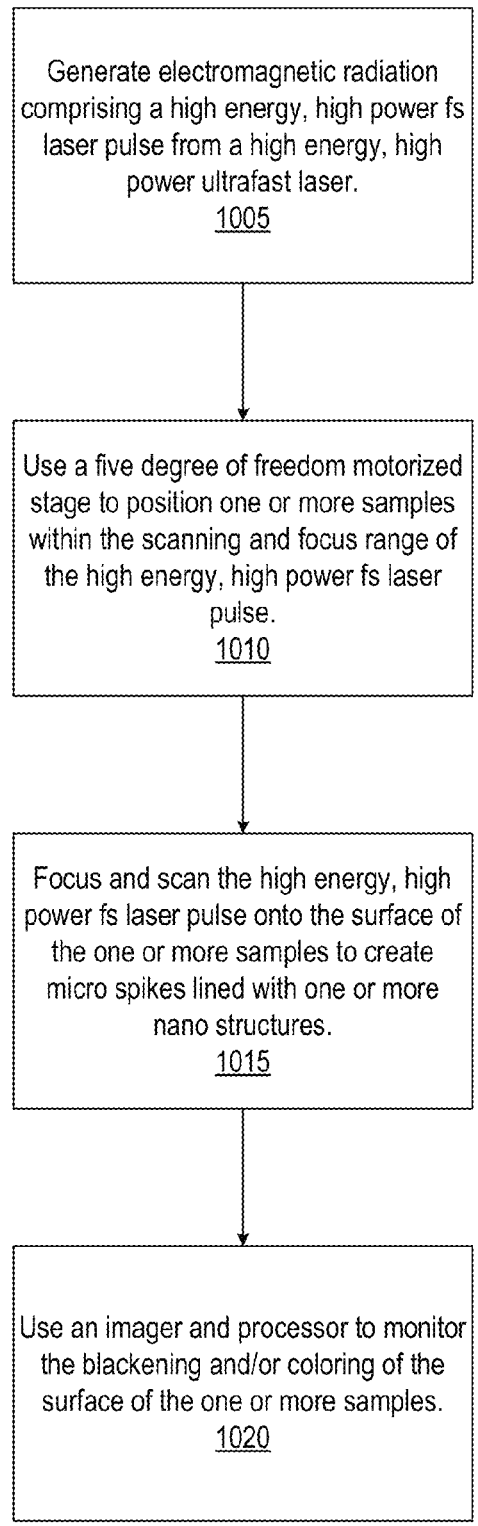

FIG. 10 is a block diagram illustrating a method for high speed surface blackening with ultrafast fiber lasers, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

The blackening and coloring of metal and non-metal surfaces are important to both military and commercial applications. Being able to change the reflectance of a variety of materials allows for applications in customized camouflage, optical sensing and imaging, countermeasures, improved solar cell efficiency, engraving, and marking just to name a few. Symmetrical geometry and high aspect ratio ablation of two-dimensional (2D) surface micro and nano structures is key in order to obtain angular independent, super-black surfaces covering a broad spectral range through a light trapping mechanism. Custom coloring may also be achieved by controlling the filling factor and period of the 2D surface structure.

Figure 1:
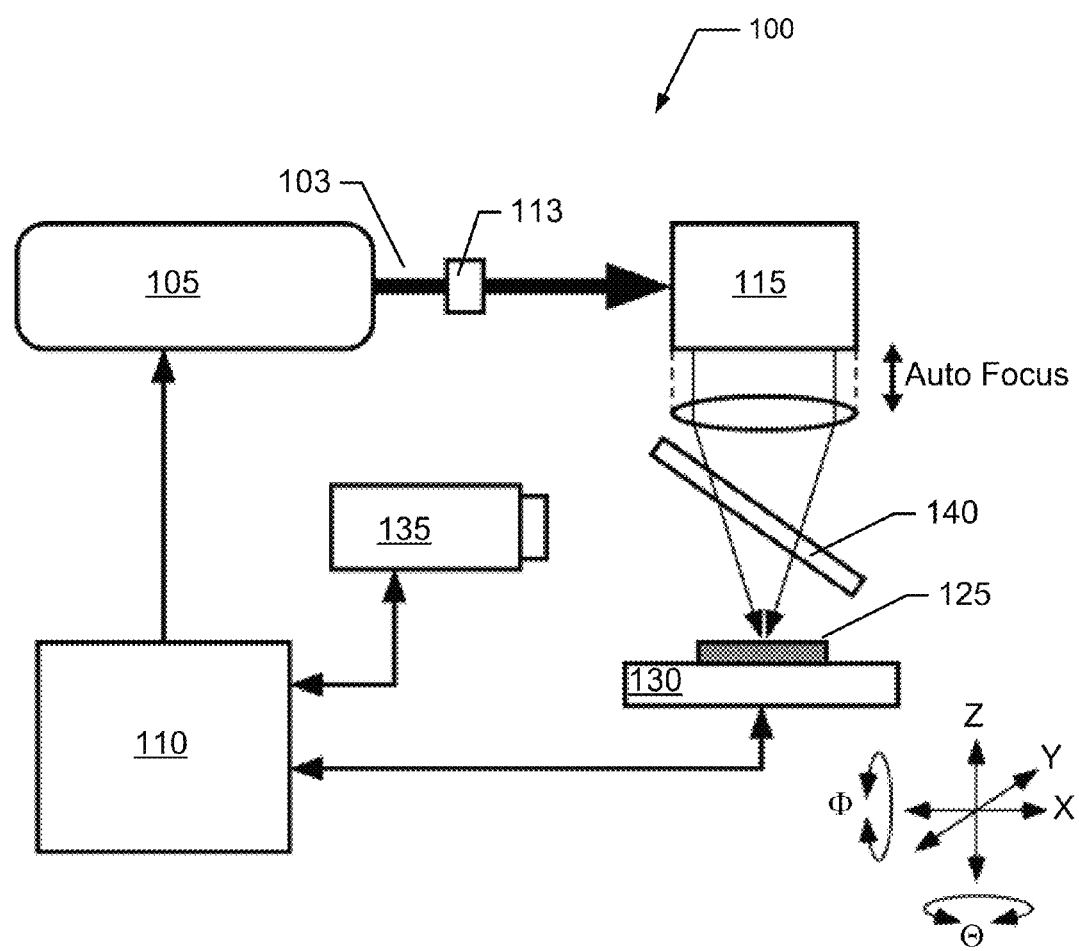
FIG. 1 is a schematic illustration of an apparatus for high speed surface blackening/coloring, in accordance with some embodiments.

FIG. 1 is a schematic illustration of an apparatus for high speed surface blackening/coloring, in accordance with some embodiments.

In some embodiments, the femtosecond fiber laser based surface blackening/coloring processing system 100 comprises a high energy femtosecond fiber laser 105. The high energy femtosecond fiber laser which comprises an AO pulse picker to select pulses at different pulse repetition rates (PRR) and formats, i.e. multi-pulses, burst pulse, individual pulse shaping, etc., generates laser pulses 103. The laser pulses may comprise a substantially Gaussian beam profile. The laser parameters are a PRR from about 0.1 MHz to 10 MHz, an average power of about 0.1 to 2000 W, a pulse width of about 100 fs to 10 ps, an energy from about 10 µJ to 1,000 µJ and a wavelength between about 0.2 to 3 µm. Examples of ultrafast fiber lasers include but are not limited to Yb doped fiber laser at 1025-1100 nm and its harmonic generations to green and UV, Er doped fiber laser at 1525-1610 nm and its harmonic generations, Tm doped fiber laser at 1950-2050 nm, Ho doped fiber laser at 2050-2150 nm, and Er:ZBLAN fiber lasers at 2700-2900 nm. A computer 110 is used to control the PRR and the power of the high energy femtosecond fiber laser 105. The system may comprise beam shaping optics 113 to shape the laser pulses 103 to a flat top or cone shape depending on the material or sample being processed. Additionally, the beam shaping optics may comprise a diffractive optical element to create multiple beamlets from a single source. The sample may comprise a metal, a semiconductor, a ceramic, a polymer, or a glass. The surface of the sample may be flat or curved. In addition, the surface of the sample may be coated with a coating such as an anodized layer, an oxide layer, or a transparent polymer coating. The high energy, fs pulse 103 is coupled into an auto focusing scanner 115 which scans and focuses the pulses 103 onto the material or sample 125. If the sample is coated, the fs laser will write (i.e. blacken or color) below the coating. Thus maintaining the integrity of the protective coating of the sample. The sample 125 may be positioned using a five degrees of freedom (5D) high speed motorized stage 130 that comprises an X, Y, Z translation with angular adjustment in theta (Θ) and phi (Φ). The motorized stage 130 may be controlled by the computer 110. An imager and processor 135, such as a CCD, may also be controlled by the computer 110. The imager and processor 135 monitors the surface shape of the sample through a dichroic filter 140 as the sample is being processed. The scanner 115 may be an acousto-optic type scanner (diffraction), a magnetic resonant scanner, a mechanical scanner (rotating mirror), or an electro-optic scanner, etc. A multi-beam system may be integrated to generate multiple parallel beams to further increase the process throughput.

Figure 2:
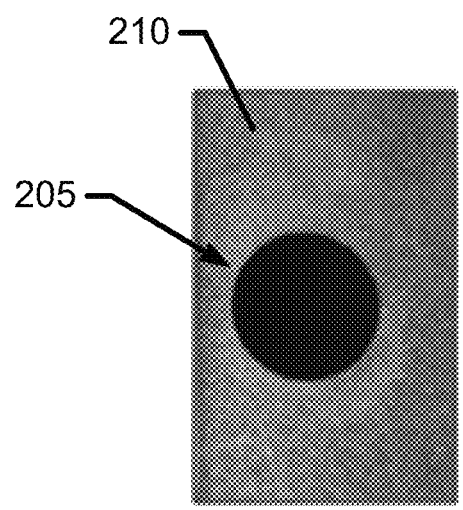
FIG. 2 is a blackened surface marking of an aluminum sample, in accordance with some embodiments.

FIG. 2 is a blackened surface marking of an aluminum sample, in accordance with some embodiments.

The fs fiber laser illustrated in FIG. 1 with high PRR (0.1 MHz to 10 MHz), in combination with a high speed scanner, will significantly increase the process throughput over 1000 times compared with solid state lasers where high PRR cannot be practically achieved. FIG. 2 shows a dime sized surface blackening 205 processed onto an aluminum sample 210. The surface blackening 205 has a spectral reflectance of less than 5% over the spectral range from 400 nm to 2500 nm. To further extend to the far IR region, it is necessary to write wider and deeper structures with higher aspect ratios. The surface blackening 205 was processed in less than 1 second using the system illustrated in FIG. 1 at 200 kHz and with a conventional Galvanometer scanner having a scanning speed of less than 10 kHz. By using a MHz scanner instead of the Galvanometer scanner, the process speed is increased by a least 100 times. Therefore, conservatively, a 1000 times increase of throughput is possible for MHz fs fiber laser based process systems, making possible large scale surface writing and volume manufacturing.

Figure 3:
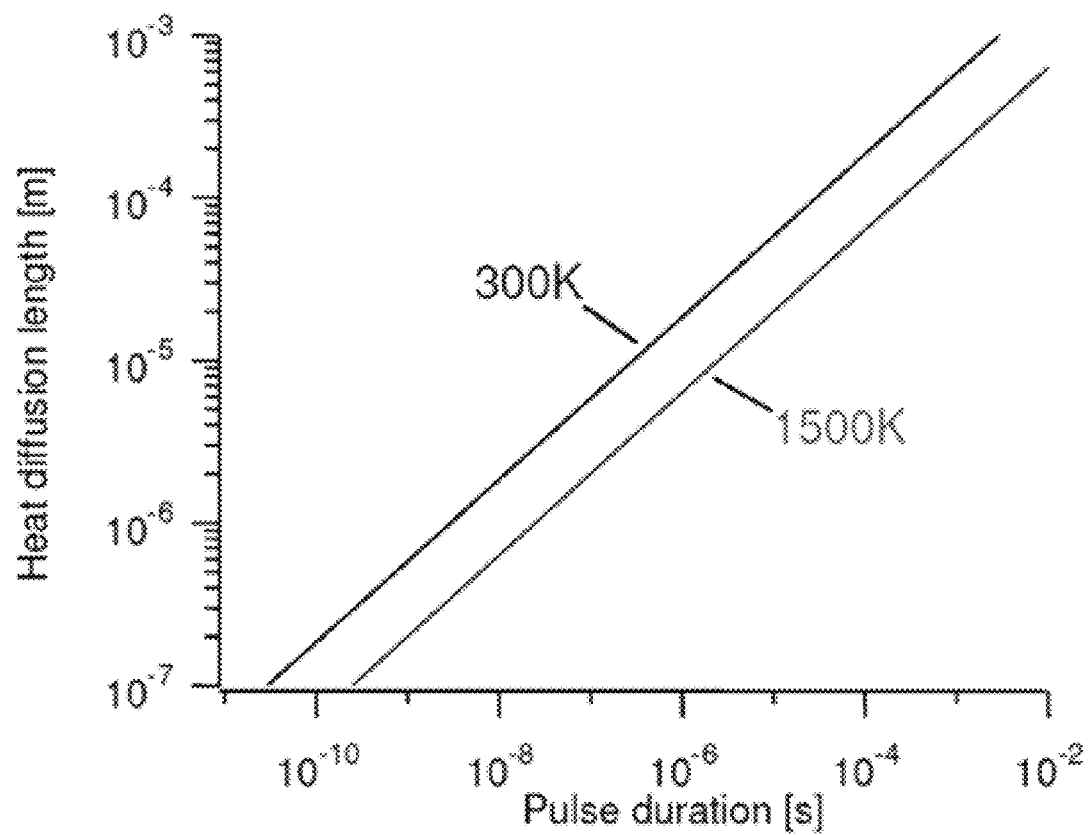
FIG. 3 is a graph of the heat diffusion length versus pulse duration, in accordance with some embodiments.

FIG. 3 is a graph of the heat diffusion length versus pulse duration, in accordance with some embodiments.

Figure 4:
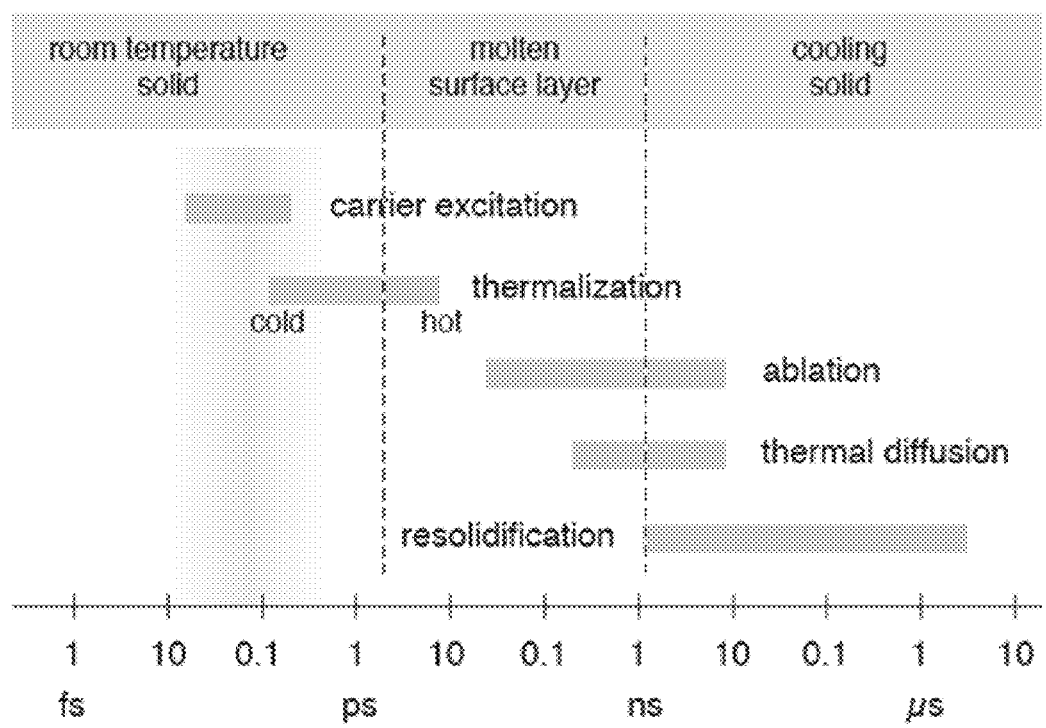
FIG. 4 is a graph of the material process mechanisms for pulsed lasers, in accordance with some embodiments.

FIG. 4 is a graph of the material process mechanisms for pulsed lasers, in accordance with some embodiments.

Femtosecond (fs) pulsed laser processing technology emerged about ten years ago and has been widely used in various material processing. The mechanism of ultrashort laser pulse modification of materials involves absorption of fs laser energy by materials (e.g., silicon, metal, glass, and polymer) and subsequent dissipation of the absorbed energy. FIG. 3 illustrates the heat diffusion length as a function of the pulse duration for a sample within a 300 K to 1500 K temperature range. As the pulse duration is shortened, the heat diffusion length is reduced, thus resulting in less heat affected zone (HAZ).

The energy absorption process in the context of fs-laser ablation follows the sequential steps of 1) production of initial seed electrons through either nonlinear photoionization of free electrons or excitation of impurity defects, 2) avalanche photoionization, and 3) plasma formation. Note, the laser energy is only absorbed in the small focal volume of the laser, where the intensity is high enough for multi-photon ionization to occur in less than a picosecond (ps).

The energy dissipation process involves the transfer of the energy from the hot plasma created by laser pulses to the lattice, resulting in the modified regions in the material. This process is less well understood than the energy absorption process. It is known that the energy dissipation process occurs on a timescale of hundreds of nanoseconds (ns) to microseconds (µs), substantially longer than the hundreds of fs required for the energy absorption process. It is believed that the primary energy dissipation mechanisms are a combination of thermal diffusion and shockwave generation, though it remains uncertain about which process is dominant and may depend on the precise writing conditions (e.g., pulse fluence, repetition rate).

The end results of the fs laser-material interaction are related with physical, chemical, and mechanical changes of the material after exposure to the laser beam. FIG. 4 summarizes the mechanisms (carrier excitation, thermalization, ablation, thermal diffusion, and resolidification) that guide the laser micro-processing. A rule of thumb is that when the pulse width is less than 1 ps, the thermal diffusion can be confined in micron dimension and the heat affected zone (HAZ) can be reduced and/or even eliminated.

Figure 5:
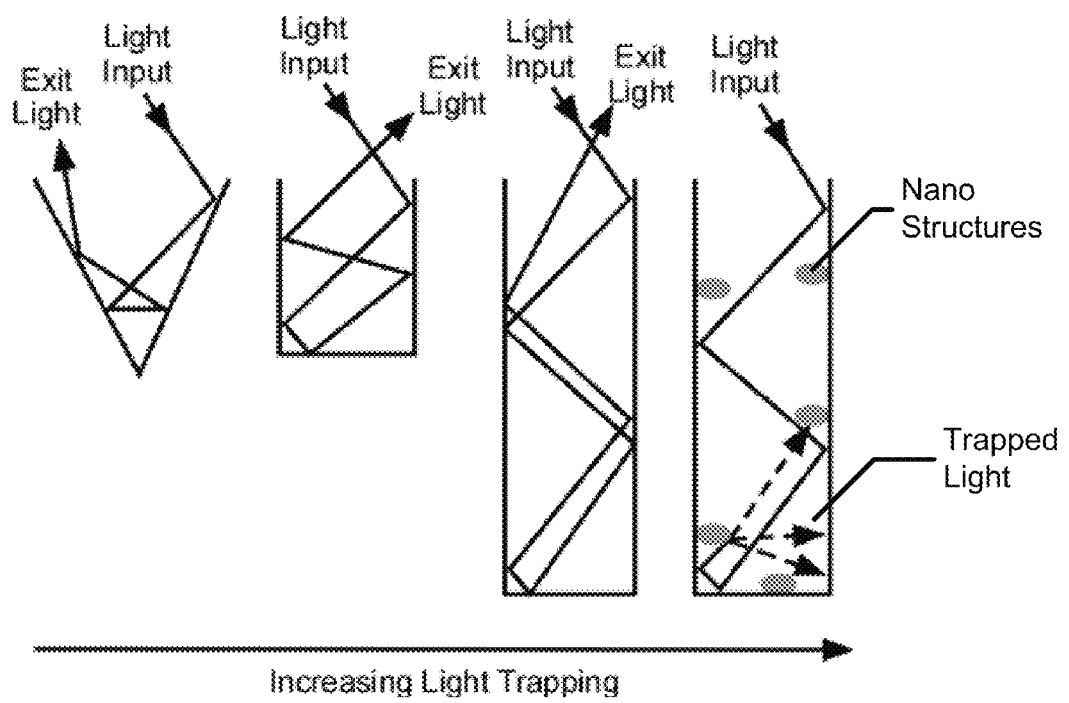
FIG. 5 is a schematic diagram illustrating the light trapping improvement with high aspect ratio micro spikes lined with nano structures, in accordance with some embodiments.

FIG. 5 is a schematic diagram illustrating the light trapping improvement with high aspect ratio micro spikes lined with nano structures, in accordance with some embodiments.

Femtosecond fiber laser processing is becoming an attractive method for "at will" fabrication of optical devices, because not only is it deterministic, HAZ free, repeatable and allows fabrication of truly three-dimensional structures of any desired shape and size, but also inexpensive, compact, and user friendly. For micro- and nano-structuring fabrication for surface blackening and coloring, fs fiber laser processing may be used to accurately modify the ablated shape (e.g. surface relief grating, moth eye, pyramid) "at will" to obtain high aspect ratio with high resolution. It is well recognized that surface blackening has a different mechanism than with surface coloring. In surface coloring, the surface micro spikes are formed such that they are spaced according to the diffraction grating equation, $n\lambda = d \sin\theta$, where d is the spacing of the micro spikes, l is the wavelength of the desired surface coloring, n is the order of reflection, and $\theta$ is the angle defined by the zeroth order and the higher order colored reflections. In surface blackening, the enhanced broadband absorbance has been demonstrated to result from formation of irregularly distributed ablative surface micro spikes. Light trapping plays a significant role in the absorbance of light from a wide angle of view of the metal surface. Therefore, it is important to form sharp and high aspect ratio micro spikes (pillars) in order to increase the absorbance of light. The nano structures (grains) on the wall of the micro spikes strengthen the light trapping. FIG. 5 illustrates such a progressive light absorption improvement with various types of structures and micro spikes of metals and silicon. For efficient light trapping, thus surface blackening, the spacing of the micro spikes should be larger than the wavelengths that are trying to be trapped, the micro spike filling factor (defined as the ratio of the micro spike peak-to-peak spacing to the micro spike width) should be greater than about 2, and the micro spike aspect ratio (defined as the ratio of the micro spike height to the micro spike spacing) should be greater than about 1. The creation of the micro spikes with or without nano structures may be written in one dimension or two dimensions on the surface of the sample.

Figure 6A:
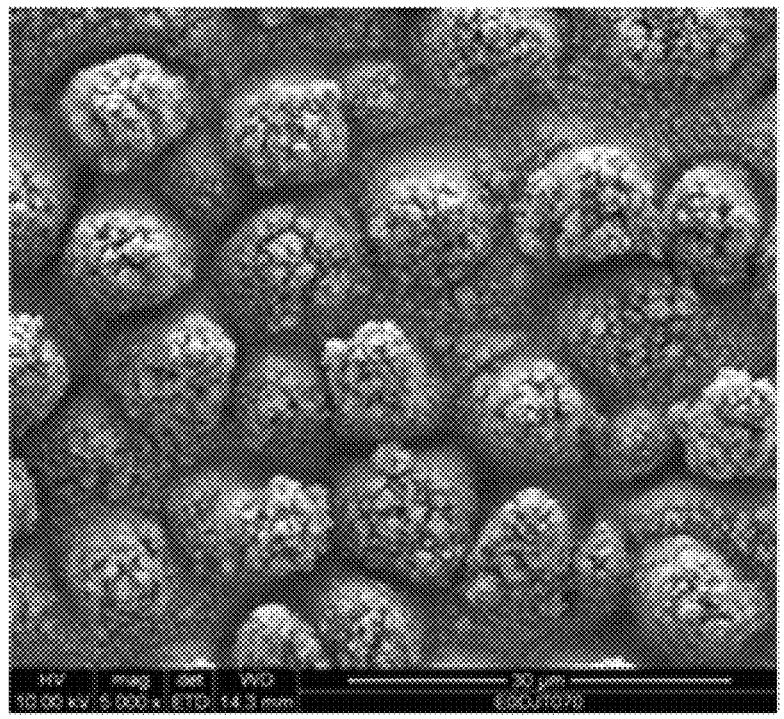
FIGS. 6A and 6B are scanning electron microscope images of the surface of a blackened sample, in accordance with some embodiments.
Figure 6B:
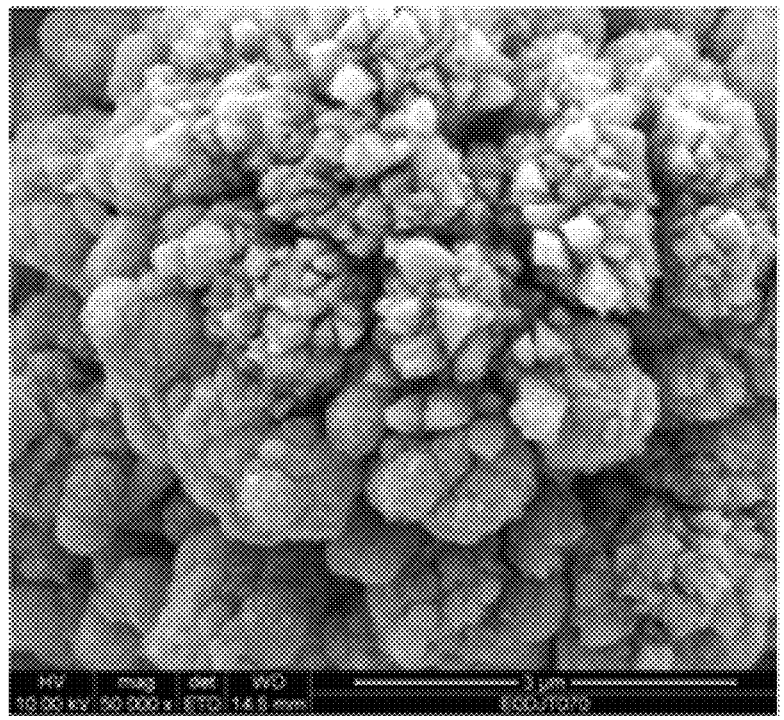

FIGS. 6A and 6B are scanning electron microscope images of the surface of a blackened sample, in accordance with some embodiments.

Femtosecond fiber laser processed surfaces exhibit wildly different morphologies, depending on structuring conditions. FIGS. 6A and B show the magnified surface covered by a quasi-ordered array of micro-spikes that are 1 µm to 15 µm tall, and spaced by 1 µm to 5 µm. The laser parameters may be modified to increase or decrease surface roughness. Nano-structures (grains) are created along with the micro spikes during processing. The fs laser process creates a disordered surface layer approximately 100 nm to 500 nm thick. The average grain size is about 10 nm to 50 nm.

Figure 7:
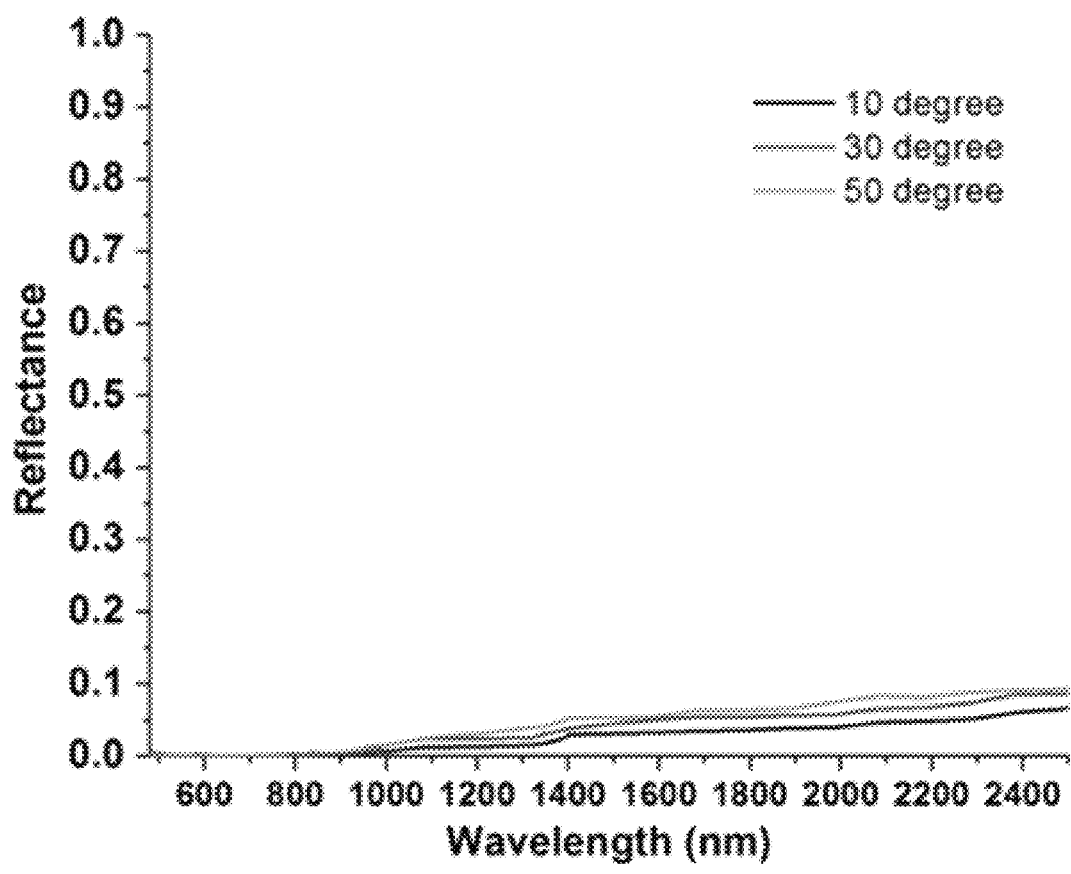
FIG. 7 is a graph showing the measured reflectance for fs fiber laser processed steel, in accordance with some embodiments.

FIG. 7 is a graph showing the measured reflectance for fs fiber laser processed steel, in accordance with some embodiments.

For a fs fiber laser processed region onto steel, over 90 to 99% absorption is obtained from the visible through the near IR ranges ($\lambda > 2500$ nm). The processed sample also shows excellent absorption performance over a large angle of incidence as shown in FIG. 7 for angle on incidences of 10°, 30°, and 50°. By writing wider (>10 µm spaced micro spikes) and deeper structures (>15 µm tall quasi-ordered array of micro spikes) with higher aspect ratios (>10) to accommodate longer wavelengths, it is possible to achieve over 99% absorption from the UV to the far IR region (8 µm to 12 µm).

FIGS. 8A, 8B, and 8C are examples of changing a Gaussian beam into square or circular flat top shapes, the phase and intensity changes from a diffractive optical element, and multiple beamlets from a diffractive optical element, respectively, in accordance with some embodiments.

Beam shaping optics may be used to create flat top laser pulses from a Gaussian beam in order to achieve the goal of creating micro and nano structures for high speed surface blackening and coloring. FIG. 8A shows how a Gaussian beam 805 may be shaped into either a beam with a square flat top 810 or a beam with a circular flat top 815. Refractive optical elements (ROE), available from Edmund Optics (http://www.edmundoptics.com) or πShaper (http://www-.pishaper.com) may be used to shape the Gaussian beam 805.

Alternatively, diffractive optical elements (DOE), such as those available from Opton (http://www.edphoton.com) may be used as they are more flexible and lightweight. Additionally, with the DOE, multiple beamlets may be created to further increase the fabrication volume capability multiple folds at a low cost since a single laser source is shared. Either element may be placed in the beam path to change the laser pulse. FIG. 8B shows the input intensity 820 and input phase 825 of a Gaussian beam and the resulting output intensity 830 and output phase 835 after passing the laser beam through a DOE. FIG. 8C shows the creation of a two dimensional array of beamlets 840 after passing the laser beam through a DOE.

FIGS. 9A and 9B illustrate two methods for blackening a glass surface, in accordance with some embodiments.

The blackening and coloring of glass surfaces or other optically transparent material surfaces presents a challenging task. The creation of micro- and nano-structures on glass surfaces can only improve the anti-reflection of light, not the absorption. In order to make the glass surface "black" to light, a thin, opaque coating or layer must be applied to the micro- and nano-structures on the glass surface. Two methods of blackening a glass surface are illustrated in FIGS. 9A and 9B. In one embodiment for glass surface blackening, fs laser pulses are first used to fabricate 2D micro- and nano-structures 905 on the top of the glass surface 906, as illustrated in FIG. 9A. In a second step, a layer of metal, such as aluminum, gold, or silver, or any other opaque material is injected 907 in powder form onto the glass micro spikes 905 concurrently with fs laser pulses 910, resulting in a deposited silicon layer 915 over the glass. In this step, isolation of air is required in order to avoid silicon reacting with oxygen. In another single step embodiment for glass surface blackening, as illustrated in FIG. 9B, carbon powder is injected 920 concurrently with the fs laser 925 creation of micro- and nano-structures on the glass surface. Under high peak power radiation, localized high temperatures induce a chemical reaction of silica with elemental carbon as expressed in Equation 1.

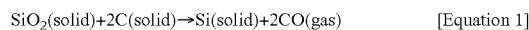

$$SiO_2(solid) + 2C(solid) \rightarrow Si(solid) + 2CO(gas) \quad [\text{Equation 1}]$$

What remains is a silicon layer on top of the micro spikes which form a thin absorption layer, thus enabling the blackening of the glass due to the trapping of light by the coated, micro- and nano-structured glass surface.

FIG. 10 is a block diagram illustrating a method for high speed surface blackening with ultrafast fiber lasers, in accordance with some embodiments.

In some embodiments, processing begins at step 1005 where a high energy, high power ultrafast laser is used to generate electromagnetic radiation comprising a high energy, high power fs laser pulse. The laser will have a PRR from about 0.1 MHz up to 10 MHz, an average power of about 0.1 to 2000 W, a pulse width of about 100 fs to 10 ps, an energy from about 10 µJ to 1,000 µJ, and a wavelength between about 0.2 to 3 Examples of ultrafast fiber lasers include but are not limited to Yb doped fiber laser at 1025-1100 nm and its harmonic generations to green and UV, Er doped fiber laser at 1525-1610 nm and its harmonic generations, Tm doped fiber laser at 1950-2050 nm, Ho doped fiber laser at 2050-2150 nm, and Er:ZBLAN fiber lasers at 2700-2900 nm. At step 1010, a five degree of freedom motorized stage is used to position one or more samples within the scanning and focus range of the high energy, high power fs laser pulse. At step 1015, the high energy, high power fs laser pulse is focused and scanned onto the surface of the one or more samples. The resulting high peak intensity in the focal region ionizes the material of the samples and creates micro- and nano-structures, micro spikes, which blacken and/or color the surface depending on the layout and structure of the micro spikes. In some embodiments for blackening and coloring of optically transparent materials such as glass, the micro spikes are subsequently coated with an opaque layer, such as aluminum, gold, or silver, or any other opaque material, through either a chemical reaction or a deposition. Alternatively, for optically transparent samples, the micro spikes may be simultaneously coated during creation of the micro spikes by the injection of carbon powder concurrently with the fs laser pulses. In some embodiments, the method further comprises at step 1020, the use of an imager and processor to monitor the blackening and/or coloring of the surface of the one or more samples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. An apparatus for high speed surface blackening and/or coloring comprising:
   an ultrashort pulse laser, wherein the ultrashort pulse laser generates an electromagnetic radiation, wherein the electromagnetic radiation comprises a wavelength, a pulse repetition rate, a pulse width, a pulse energy, and an average power, wherein the wavelength of the electromagnetic radiation generated from the ultrashort pulse laser ranges from about 0.2 µm to about 3 µm;
   a scanner comprising a scanning and focus range, wherein the scanner is configured to receive the electromagnetic radiation from the ultrashort laser and to scan and focus the electromagnetic radiation onto one or more samples; and
   a computer coupled to the ultrashort pulse laser, wherein the computer is configured to adjust the pulse repetition rate and the energy of the ultrashort pulse laser;
   the apparatus being configured to write micro structures onto the surface of the one or more samples, wherein the micro structures comprise micro spikes, wherein the surface of the micro spikes are covered with one or more nano structures.

2. The apparatus of claim 1, further comprising a refractive optical element or a diffractive optical element positioned between the ultrashort pulse laser and the scanner, wherein the refractive optical element is configured to reshape the electromagnetic radiation and wherein the diffractive optical element is configured to reshape the electromagnetic radiation and/or separate the electromagnetic radiation into multiple beamlets.

3. The apparatus of claim 1, further comprising a five degree of freedom motorized stage, wherein the five degree of freedom motorized stage is configured to position the one or more samples within the scanning and focus range of the electromagnetic radiation.

4. The apparatus of claim 1, further comprising:
   a dichroic filter positioned between the scanner and the one or more samples;
   an imager focused through the dichroic filter and onto the surface of the one or more samples; and
   a processor configured to acquire and process images;
   wherein the imager and the processor are configured to monitor the surface blackening and/or coloring of the one or more samples within the scanning and focus range of the electromagnetic radiation.

5. The apparatus of claim 1, wherein the one or more samples comprise at least one of a metal, a semiconductor, a ceramic, a polymer, and a glass.

6. The apparatus of claim 1, wherein the surface of the one or more samples are uncoated or coated, and wherein the coating comprises at least one of an anodized coating, an oxide coating, and a transparent polymer coating.

7. The apparatus of claim 1, wherein the one or more samples further comprise a flat and/or a curved surface.

8. The apparatus of claim 1, wherein the ultrashort pulse laser comprises at least one of a Yb doped fiber laser, an Er doped fiber laser, a Tm doped fiber laser, a Ho doped fiber laser, and an Er:ZBLAN fiber laser.

9. The apparatus of claim 1, wherein the pulse repetition rate of the electromagnetic radiation generated from the ultrashort pulse laser ranges from about 0.1 MHz to about 10 MHz.

10. The apparatus of claim 1, wherein the pulse width of the electromagnetic radiation generated from the ultrashort pulse laser ranges from about 100 fs to about 10 ps.

11. The apparatus of claim 1, wherein the pulse energy of the electromagnetic radiation generated from the ultrashort pulse laser ranges from about 10 µJ to about 1,000 µJ.

12. The apparatus of claim 1, wherein the average power of the electromagnetic radiation generated from the ultrashort pulse laser ranges from about 0.1 W to about 2000 W.

13. The apparatus of claim 1, wherein the scanner comprises at least one of an acousto-optic type scanner, a magnetic resonant scanner, a rotating mirror scanner, and an electro-optic scanner.

14. The apparatus of claim 1, wherein the apparatus is configured to write the micro structures onto the surface of the one or more samples in one-dimension or two-dimensions.

15. The apparatus of claim 1, wherein the spacing between the micro spikes is larger than the wavelength intended to be trapped by the micro spikes;
   wherein the micro spike filling factor is greater than about 2; and
   wherein the micro spike aspect ratio is greater than about 1.

16. The apparatus of claim 1, wherein the micro spikes are spaced according to the diffraction grating equation to color the surface of the one or more samples.

17. The apparatus of claim 1, wherein the micro spikes are coated with an opaque layer through a chemical reaction or a deposition to blacken and/or color the surface of the one or more samples.

18. A method for high speed surface blackening and/or coloring comprising:
generating electromagnetic radiation from an ultrashort pulse laser, wherein the electromagnetic radiation comprises a wavelength, a pulse repetition rate, a pulse width, a pulse energy, and an average power, wherein the wavelength of the electromagnetic radiation generated from the ultrashort pulse laser ranges from about 0.2 µm to about 3 µm;
coupling the electromagnetic radiation from the ultrashort pulse laser to a scanner comprising a scanning and focus range, wherein the scanner is configured to receive the electromagnetic radiation from the ultrashort laser and to scan and focus the electromagnetic radiation onto one or more samples;
using a computer to adjust the pulse repetition rate and the energy of the ultrashort pulse laser; and
writing micro structures onto the surface of the one or more samples, wherein the micro structures comprise micro spikes, wherein the surface of the micro spikes are covered with one or more nano structures.

19. The method of claim 18 further comprising using a refractive optical element or a diffractive optical element positioned between the ultrashort pulse laser and the scanner, wherein the refractive optical element is configured to reshape the electromagnetic radiation and wherein the diffractive optical element is configured to reshape the electromagnetic radiation and/or separate the electromagnetic radiation into multiple beamlets.

20. The method of claim 18 further comprising using a five degree of freedom motorized stage, wherein the five degree of freedom motorized stage is configured to position the one or more samples within the scanning and focus range of the electromagnetic radiation.

21. The method of claim 18 further comprising:
using a dichroic filter positioned between the scanner and the one or more samples;
focusing an imager through the dichroic filter and onto the surface of the one or more samples; and
using a processor to acquire and process images to monitor the surface blackening and/or coloring of the one or more samples within the scanning and focus range of the electromagnetic radiation.

22. The method of claim 18, wherein the one or more samples comprise at least one of a metal, a semiconductor, a ceramic, a polymer, and a glass.

23. The method of claim 18, wherein the surface of the one or more samples are uncoated or coated, and wherein the coating comprises at least one of an anodized coating, an oxide coating, and a transparent polymer coating.

24. The method of claim 18, wherein the one or more samples further comprise a flat and/or a curved surface.

25. The method of claim 18, wherein the ultrashort pulse laser comprises at least one of a Yb doped fiber laser, an Er doped fiber laser, a Tm doped fiber laser, a Ho doped fiber laser, and an Er:ZBLAN fiber laser.

26. The method of claim 18, wherein the pulse repetition rate of the electromagnetic radiation generated from the ultrashort pulse laser ranges from about 0.1 MHz to 10 MHz.

27. The method of claim 18, wherein the pulse width of the electromagnetic radiation generated from the ultrashort pulse laser ranges from about 100 fs to about 10 ps.

28. The method of claim 18, wherein the pulse energy of the electromagnetic radiation generated from the ultrashort pulse laser ranges from about 10 µJ to about 1,000 µJ.

29. The method of claim 18, wherein the average power of the electromagnetic radiation generated from the ultrashort pulse laser ranges from about 0.1 W to about 2000 W.

30. The method of claim 18, wherein the scanner comprises at least one of an acousto-optic type scanner, a magnetic resonant scanner, a rotating mirror scanner, and an electro-optic scanner.

31. The method of claim 18, further comprising writing the micro structures onto the surface of the one or more samples in one-dimension or two-dimensions.

32. The method of claim 18, wherein the spacing between the micro spikes is larger than the wavelength intended to be trapped by the micro spikes;
wherein the micro spike filling factor is greater than about 2; and
wherein the micro spike aspect ratio is greater than about 1.

33. The method of claim 18, further comprising spacing the micro spikes according to the diffraction grating equation to color the surface of the one or more samples.

34. The method of claim 18, further comprising coating the micro spikes with an opaque layer through a chemical reaction or a deposition to blacken and/or color the surface of the one or more samples.

* * * * *